US008985851B2

(12) United States Patent
Kim (10) Patent No.: US 8,985,851 B2
(45) Date of Patent: Mar. 24, 2015

(54) X-RAY DETECTOR

(75) Inventor: Young Ik Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 392 days.

(21) Appl. No.: 13/537,562

(22) Filed: Jun. 29, 2012

(65) Prior Publication Data

US 2013/0251110 A1    Sep. 26, 2013

(30) Foreign Application Priority Data

Mar. 20, 2012  (KR) ......................... 10-2012-0028311

(51) Int. Cl.
*G03B 42/04*     (2006.01)

(52) U.S. Cl.
CPC ...................... *G03B 42/04* (2013.01)
USPC ......................................................... 378/189

(58) Field of Classification Search
USPC .................................................. 378/181, 189
See application file for complete search history.

(56) References Cited

U.S. PATENT DOCUMENTS

| | | | | |
|---|---|---|---|---|
| 2005/0074096 A1* | 4/2005 | Sisto et al. | ..................... | 378/189 |
| 2005/0117709 A1* | 6/2005 | Dippl et al. | ..................... | 378/189 |
| 2005/0135564 A1* | 6/2005 | Dippl et al. | ..................... | 378/167 |
| 2005/0148851 A1* | 7/2005 | Dippl et al. | ..................... | 600/407 |
| 2008/0159486 A1* | 7/2008 | Hesl et al. | ...................... | 378/189 |
| 2010/0220838 A1* | 9/2010 | Kobayashi | ..................... | 378/189 |
| 2011/0075817 A1* | 3/2011 | Takahashi et al. | ............ | 378/189 |

FOREIGN PATENT DOCUMENTS

| | | | |
|---|---|---|---|
| KR | 10-2006-0029991 A | 4/2006 |
| KR | 10-2009-0124927 A | 12/2009 |
| KR | 10-2010-0082631 A | 7/2010 |
| KR | 10-2011-0017042 A | 2/2011 |

* cited by examiner

*Primary Examiner* — Glen Kao
(74) *Attorney, Agent, or Firm* — Lee & Morse, P.C.

(57) ABSTRACT

An X-ray detector includes a cassette including a first terminal and a second terminal, and a bucky including a first electrode and a plurality of second electrodes, the first terminal of the cassette being connected to the first electrode of the bucky and the second terminal of the cassette being connected to at least one of the plurality of second electrodes of the bucky, wherein the cassette and the bucky are configured to be connected to each other in at least two different connection modes, at least one of the second electrodes connected to the second terminal in a first connection mode being different from the second electrodes connected to the second terminal in a second connection mode.

20 Claims, 11 Drawing Sheets

X-RAY DETECTOR

CROSS-REFERENCE TO RELATED APPLICATION

This application claims priority from Korean Patent Application No. 10-2012-0028311 filed on Mar. 20, 2012 in the Korean Intellectual Property Office, the disclosure of which is incorporated herein by reference in its entirety.

BACKGROUND OF THE INVENTION

1. Field of the Invention

Example embodiments relate to an X-ray detector, and more particularly, to an X-ray detector including a cassette detecting X-ray connected to a bucky.

2. Description of the Related Art

An X-ray detector is an apparatus which detects an amount of X-rays transmitted through an object, e.g., a human body, based on a difference in the energy intensity distribution of the transmitted X-rays, thereby identifying the internal structure or state of the object. For example, the X-ray detector may be applied to a human body and may be used to identify the internal structure of the human body or objects thereon/therein, e.g., in a security check field.

Example of the X-ray detector may include a computer radiography (CR) using an image panel, a scintillator, a CCD detector using a charge coupled device, and a flat panel detector using a thin film transistor. For example, the flat panel detector may be manufactured and used in a cassette. The cassette type flat panel detector may detect X-rays in a state in which it is connected to or disconnected from a bucky. If the cassette type flat panel detector is disconnected from the bucky, the cassette may include a rechargeable battery.

SUMMARY OF THE INVENTION

Example embodiments provide an X-ray detector having a battery easily charged when a cassette is mounted in a bucky.

Example embodiments also provide an X-ray detector having a cassette mounted in a bucky at various angles.

According to embodiments, an X-ray detector may include a cassette including a first terminal and a second terminal, and a bucky including a first electrode and a plurality of second electrodes, the first terminal of the cassette being connected to the first electrode of the bucky and the second terminal of the cassette being connected to at least one of the plurality of second electrodes of the bucky, wherein the cassette and the bucky are configured to be connected to each other in at least two different connection modes, at least one of the second electrodes connected to the second terminal in a first connection mode being different from the second electrodes connected to the second terminal in a second connection mode.

The cassette may further include a battery, the battery being configured to be charged in each connection mode.

The second terminals may be disposed in the battery.

The first electrode may be a ground electrode, and the plurality of second electrodes may be plus (+) electrodes.

The plurality of second electrodes may be connected to a same power supply.

The cassette may further include an insulation layer exposing the first terminal and the second terminal.

The insulation layer may include a circular opening exposing the first and second terminals, the first terminal being in a center of the circular opening, and the second terminal being on a perimeter of the circular opening.

The bucky may further include electrode connecting parts connected to two or more of the plurality of second electrodes, the second electrodes being connected to branches separated from the electrode connecting parts.

At least portions of the electrode connecting parts may be shaped as circular arches about the first electrode.

The electrode connecting parts may be linear between second electrodes connected to the electrode connecting parts.

The plurality of second electrodes may be of pogo-pin types.

According to other embodiments, an X-ray detector may include a cassette including a first terminal through a third terminal, and a bucky including a first electrode and a plurality of second electrodes arranged around the first electrode, the first terminal of the cassette being connected to the first electrode of the bucky and the second terminal of the cassette being connected to only some of the plurality of second electrodes of the bucky, wherein the cassette and the bucky are configured to be connected to each other in a plurality of connection modes including a first connection mode and a second connection mode, the second electrodes connected to the second terminal in the first connection mode being different from the second electrodes connected to the second terminal in the second connection mode, and the second electrode connected to the third terminal in the first connection mode is different from the second electrode connected to the third terminal in the second connection mode.

The cassette may have a rectangular plane, the first to third terminals being arranged on the rectangular plane, and a straight line connecting the second terminal and the third terminal being parallel to one side of the plane.

A number of the plurality of second electrodes may be n, the second electrodes being arranged in a shape of a regular n-polygon having each of the plurality of second electrodes at a vertex.

The number of the plurality of second electrodes may be four, the plurality of second electrodes being arranged in a square shape.

A distance between the second terminal and the third terminal and a distance between adjacent ones of the plurality of second electrodes may be equal to each other.

The cassette may include a battery, the battery being configured to be charged in each of the plurality of connection modes.

The second terminal and the third terminal may be disposed in the battery.

The first electrode may be a ground electrode, and the plurality of second electrodes are plus (+) electrodes.

The bucky may include electrode connecting parts connected to two or more of the plurality of second electrodes, and the second electrodes connected to the electrode connecting parts may be shaped of branches separated from the electrode connecting parts.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION OF THE INVENTION

Example embodiments will now be described more fully hereinafter with reference to the accompanying drawings, in which preferred embodiments are shown. Example embodiments, however, may be embodied in different forms and should not be construed as limited to the embodiments set forth herein. Rather, these embodiments are provided so that this disclosure will be thorough and complete, and will fully convey the inventive scope to those skilled in the art. The same reference numerals indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Hereinafter, example embodiments will be described in further detail with reference to the accompanying drawings.

Figure 1:
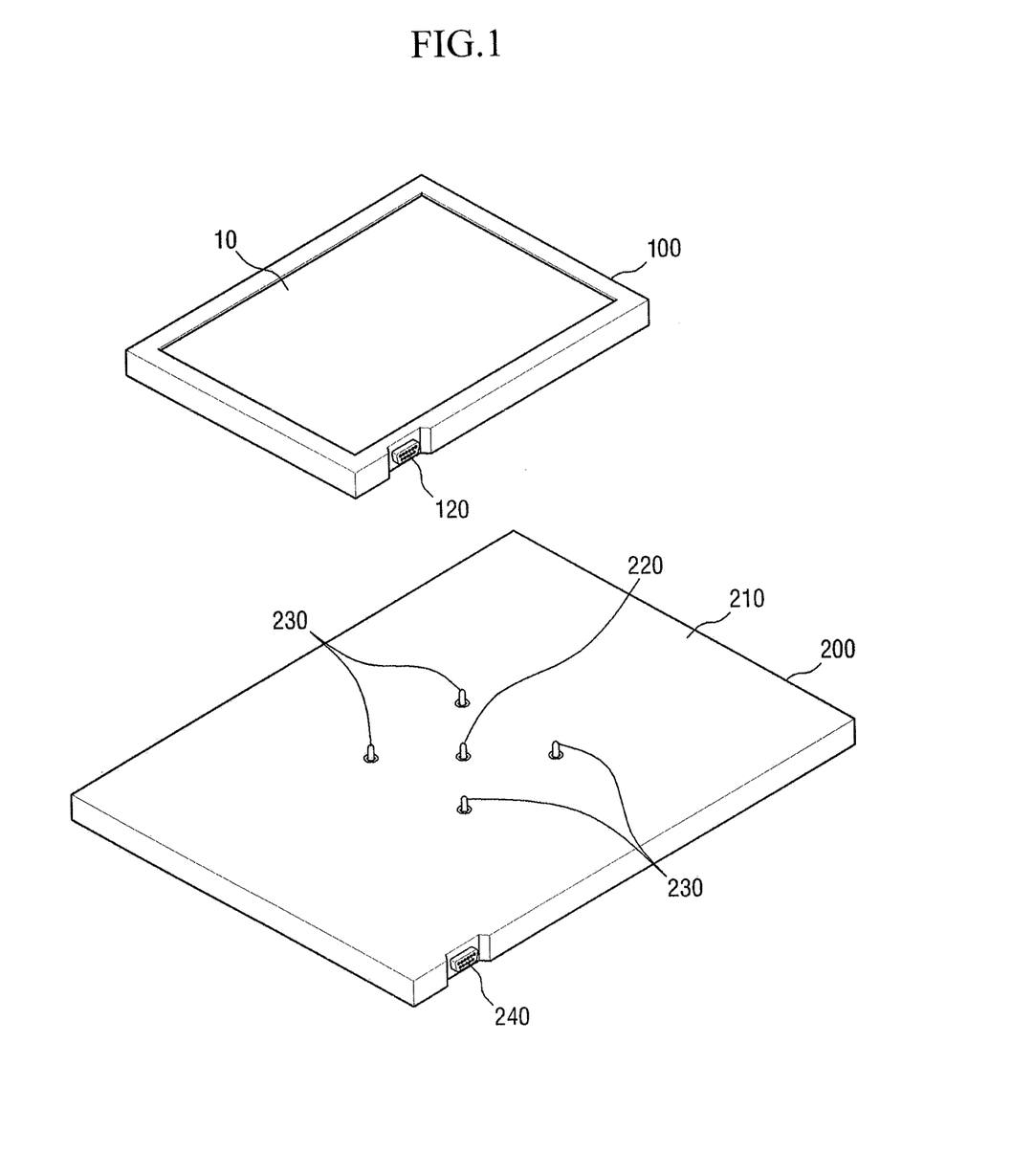
FIG. 1 is an exploded perspective view of an X-ray detector according to an embodiment.

FIG. 1 is an exploded perspective view of an X-ray detector according to an embodiment. Referring to FIG. 1, an X-ray detector according to an embodiment may include a cassette 100 and a bucky 200.

The cassette 100 detects X-rays and converts the X-rays into image data, e.g., digital data. The cassette 100 may be mounted in the bucky 200. The cassette 100 may be connected to or disconnected from the bucky 200.

The cassette 100 may include a detection surface 10 on a first surface. The cassette 100 may detect the X-rays passing through the detection surface 10, and may convert the detected X-rays into image data to be stored. According to some embodiments, the cassette 100 may further include a first data terminal 120. A cable may be connected to the first data terminal 120.

For example, the first data terminal 120 may be connected through the cable to a second data terminal 240 included in the bucky 200. When the first data terminal 120 and the second data terminal 240 are connected to each other, the cassette 100 may exchange data with the bucky 200. For example, the data exchanged between the cassette 100 and the bucky 200 may include data regarding X-rays detected by the detection surface 10 and data necessary for operating the cassette 100.

In another example, the first data terminal 120 of the cassette 100 may be connected through the cable to an electric device other than the bucky 200. For example, the cassette 100 may be connected to a computer or an image display device through the first data terminal 120. According to some other embodiments, the cassette 100 may receive external power through the first data terminal 120 and then be charged.

Figure 2:
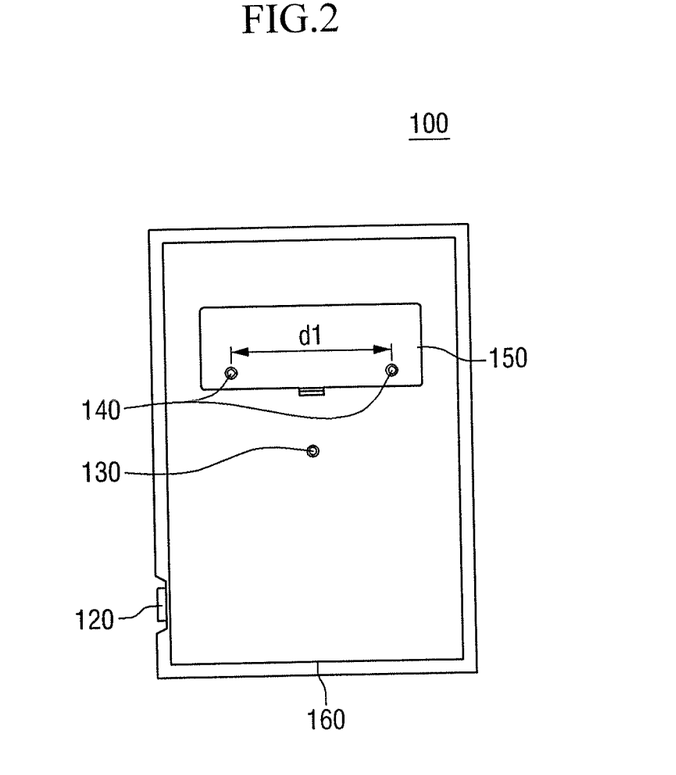
FIG. 2 is a bottom view of a cassette according to an embodiment.

FIG. 2 is a bottom view of the cassette 100. Referring to FIG. 2, the cassette 100 may include a first terminal 130 and a plurality of second terminals 140 on a second surface of the cassette 100, e.g., on a surface opposite the detection surface 10.

The first terminal 130 may be recessed to the inside of the cassette 100 from the second surface of the cassette 100, e.g., the first terminal 130 may be a groove recessed into the second surface of the cassette 100. In such a state, when the cassette 100 is mounted onto and connected to the bucky 200, a first electrode 220 protruding from a first surface of the bucky 200 (FIG. 1) is inserted into the recessed first terminal 130 of the cassette 100 (FIG. 2), thereby preventing the cassette 100 and the bucky 200 from being separated from each other due to horizontal movement. According to some embodiments, the first terminal 130 may not be recessed and may be formed on a substantially same plane as the second surface of the cassette 100. For example, the first terminal 130 may be a ground terminal.

The second terminals 140 of the cassette 100 may be formed on the second surface of the cassette 100, i.e., on a same surface as the first terminal 130. For example, as illustrated in FIG. 2, the plurality of second terminals 140 may include two second terminals. A distance d1 between the two second terminals 140 may equal a distance d2 between two adjacent second electrodes 230 of the bucky 200 (FIGS. 1 and 3) to be described later. Distances between each of the two second terminals 140 and the first terminal 130 may equal each other. A distance between each of the second terminals 140 and the first terminal 130 may equal a distance between the first electrode 220 and the second electrodes 230 of the bucky 200, as will be discussed later. When the cassette 100 is mounted in the bucky 200, each of the second terminals 140 may be connected to a respective second electrode 230. According to some embodiments, the second terminals 140 may be plus (+) terminals.

The second terminals 140 may be recessed to the inside of the cassette 100 from the second surface of the cassette 100. In such a state, when the cassette 100 is mounted into and then connected to the bucky 200, the second electrodes 230 protruding from the bucky 200 are inserted into the recessed second terminals 140, thereby preventing the cassette 100 and the bucky 200 from being separated from each other due to horizontal movement. According to some embodiments, the second terminals 140 may not be recessed and may be formed on the substantially same surface as the second surface of the cassette 100.

For example, the second surface of the cassette 100, i.e., where the plurality of second terminals 140 is disposed, may be rectangular. When the number of the second terminals 140 is two, a straight line connecting the two second terminals 140 may be parallel to one side of the plane of the cassette 100 where the plurality of second terminals 140 are disposed, e.g., the line connecting the two second terminals 140 may be parallel to a short side of the rectangular second surface of the cassette 100.

As further illustrated in FIG. 2, the cassette 100 may include a battery 150. When the cassette 100 is separated from the bucky 200, the battery 150 may supply power to the cassette 100 for driving the cassette 100. The battery 150 may be charged when the cassette 100 is mounted into and connected to the bucky 200. In more detail, when the cassette 100 is mounted in the bucky 200, i.e., when the first terminal 130 is connected to the first electrode 220 and the second terminals 140 are connected to the second electrodes 230, the battery 150 may be charged by the power applied to the first electrode 220 or the second electrodes 230. According to some embodiments, the battery 150 may also be charged by the power supplied through the first data terminal 120.

According to some other embodiments, the battery 150 may be charged by both the power supplied through the first terminal 130 and the second terminals 140 and power supplied through the first data terminal 120. According to yet other embodiments, the battery 150 may be charged by the power supplied through the first terminal 130, the power supplied through the second terminals 140, or the power supplied through the first data terminal 120.

In addition, according to some embodiments, the second electrodes 140 may be disposed in the battery 150. If the second electrodes 140 are disposed in the battery 150, wires for connecting the second electrodes 140 and the battery 150 may be omitted or simply configured.

As further illustrated in FIG. 2, the cassette 100 may further include an insulation layer 160 on the second surface of the cassette 100. The insulation layer 160 may expose the first terminal 130 and the second terminals 140. For example, the insulation layer 160 may be disposed on the circular arc of a circle having the first terminal 130 as the center and a distance between the first terminal 130 and each of the second terminals 140 as a radius. The insulation layer 160 may prevent a short circuit between the cassette 100 and the bucky 200, e.g., when the cassette 100 is mounted inside the bucky 200, and/or between each of the first electrode 220 and the second electrodes 230 to regions of the cassette 100 other than the first terminal 130 or the second terminals 140.

Referring back to FIG. 1, the cassette 100 may be mounted in the bucky 200. The bucky 200 may be, e.g., a stand-type bucky or a table-type bucky. If the cassette 100 is mounted in the bucky 200, the bucky 200 may charge the cassette 100 or exchange data with the cassette 100. Although not shown, the bucky 200 may further include a device for exchanging data with the cassette 100, a display device for displaying a state of the X-ray detector, and a control device for controlling the cassette 100.

As illustrated in FIG. 1, the bucky 200 may include the first electrode 220 and a plurality of the second electrodes 230 on a first surface 210. The first surface 210 may be a plane to which the cassette 100 is connected and mounted. The first surface 210 may be a plane of the bucky 200 facing the second surface of the cassette 100, i.e., where the first terminal 130 and the second terminals 140 are disposed when the cassette 100 is mounted in the bucky 200.

Figure 3:
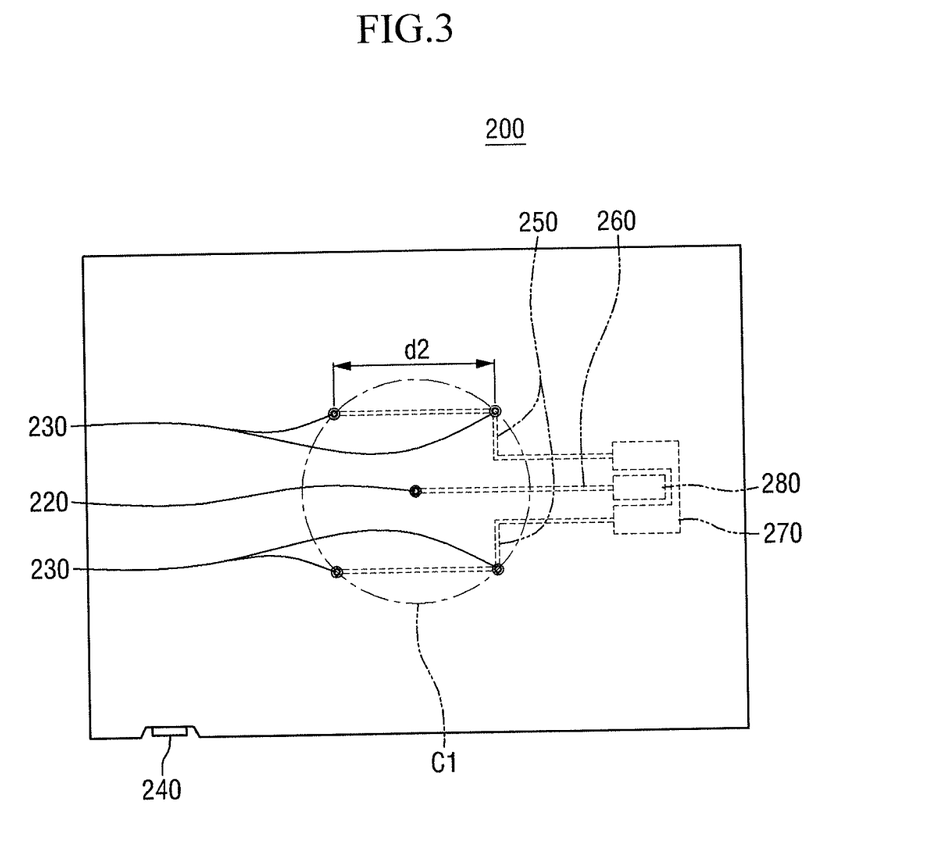
FIG. 3 is a plan view of a bucky according to an embodiment.

FIG. 3 is a plan view of a bucky according to an embodiment. Hereinafter, the bucky 200 will be described in further detail with reference to FIGS. 1 and 3.

The first electrode 220 may protrude to the outside of the bucky 200 from the first surface 210 of the bucky 200. The protruding first electrode 220 may be recessed to the inside of the first surface 210 when pressure is applied from above. According to some embodiments, in order to make the first electrode 220 to be recessed to the inside of the first surface 210 when pressure is applied from above, the first electrode 220 may be of a Pogo-pin type, including a spring. The first electrode 220 may be a ground electrode. When the cassette 100 is mounted in the bucky 200, the first electrode 220 may make contact with the first terminal 130 to then be connected thereto.

The second electrodes 230 may protrude to the outside of the bucky 200 from the first surface 210 of the bucky 200. The second electrodes 230 may be recessed to the inside of the first surface 210 when pressure is applied from above. Accordingly, when the cassette 100 is mounted in the bucky 200, the second electrodes 230 not connected to the second terminals 140 may be inwardly recessed so that the cassette 100 may not be slanted. According to some embodiments, in order to make the first electrode 220 to be recessed to the inside of the first surface when pressure is applied from above, the second electrodes 230 may be of a Pogo-pin type, including a spring. The second electrodes 230 may be plus (+) electrodes. According to some embodiments, the same voltage may be applied to the plurality of second electrodes 230. In addition, according to some other embodiments, the respective second electrodes 230 may be connected to the same power source.

In an exemplary embodiment, the number of second electrodes 230 may be 4, but embodiments are not limited thereto. For example, the second electrodes 230 may be arranged on a circular arc of a circle (C1) having the first electrode 220 at its center. A distance between the first electrode 220 and the second electrodes 230 and a distance between the first terminal 130 and the second terminals 140 may be equal to each other. A distance between adjacent second electrodes 230 may be d2. The distance d2 may be equal to a distance d1 between the second terminals 140. If the number of the plurality of second electrodes 230 is n, the plurality of second electrodes 230 may be disposed at vertexes of a regular n-polygon. For example, as shown in FIGS. 1 and 2, four second electrodes 230 may be disposed at positions corresponding to vertexes of a square.

When the cassette 100 is connected to the bucky 200, some of the plurality of second electrodes 230 may contact the second terminals 140 to be connected thereto. For example, when the number of second terminals 140 is two, two of the plurality of second electrodes 230 may be connected to the two second terminals 140. According to some embodiments, the remaining two second electrodes 230 not connected to the second terminals 140 may be covered by the insulation layer 160, thereby preventing a short circuit. Connection modes, e.g., connection configurations, between the second electrodes 230 and the second terminals 140 will be described in detail with reference to FIGS. 4 to 7.

FIGS. 4 to 7 illustrate connection configurations between the cassette 100 and the bucky 200 according to embodiments.

As discussed previously with reference to FIG. 3, only some of the second electrodes 230 of the bucky 200 may be connected to the second terminals 140 of the cassette 100. For example, any of the second electrodes 230 may be compatible with, e.g., may fit into, any of the second terminals 140, so the bucky 200 may be positioned at different positions, e.g., may be rotated, on the cassette 100 to connected different second electrodes 230 to the second terminals 140 of the cassette 100. In other words, the bucky 200 may be positioned on the cassette 100 in different geometrical configurations in accordance with the exact second electrodes 230 connected to the second terminal 140.

For example, only one pair of a first pair of second electrodes 231 and a second pair of second electrodes 232 may be connected to the second terminal 140. Therefore, the bucky 200 may be rotated and positioned in different positions, i.e., different connection modes, so different second electrodes 230 may be connected to the second terminal 140. For example, connection modes between the cassette 100 and the bucky 200 may include first to fourth connection modes according to the arrangement of the first pair of second electrodes 231 and the second pair of the second electrodes 232.

Figure 4:
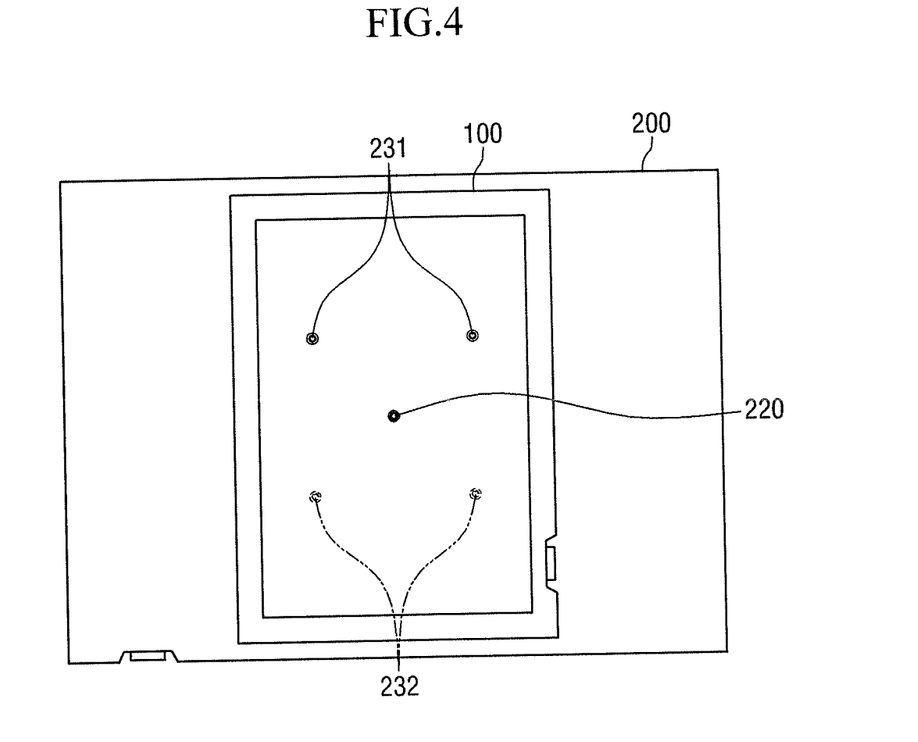
FIGS. 4 to 7 illustrate different configurations of combining a cassette and a bucky according to an embodiment.

FIG. 4 illustrates a state in which the cassette 100 and the bucky 200 are combined with each other in the first connection mode. In the first connection mode, the first pair 231 may be arranged as two upper second electrodes 231 connected to the second terminals 140, and the second pair 232 may be arranged as two lower second electrodes 232 not connected to the second terminals 140, while the cassette 100 is connected to the bucky 200.

Figure 5:
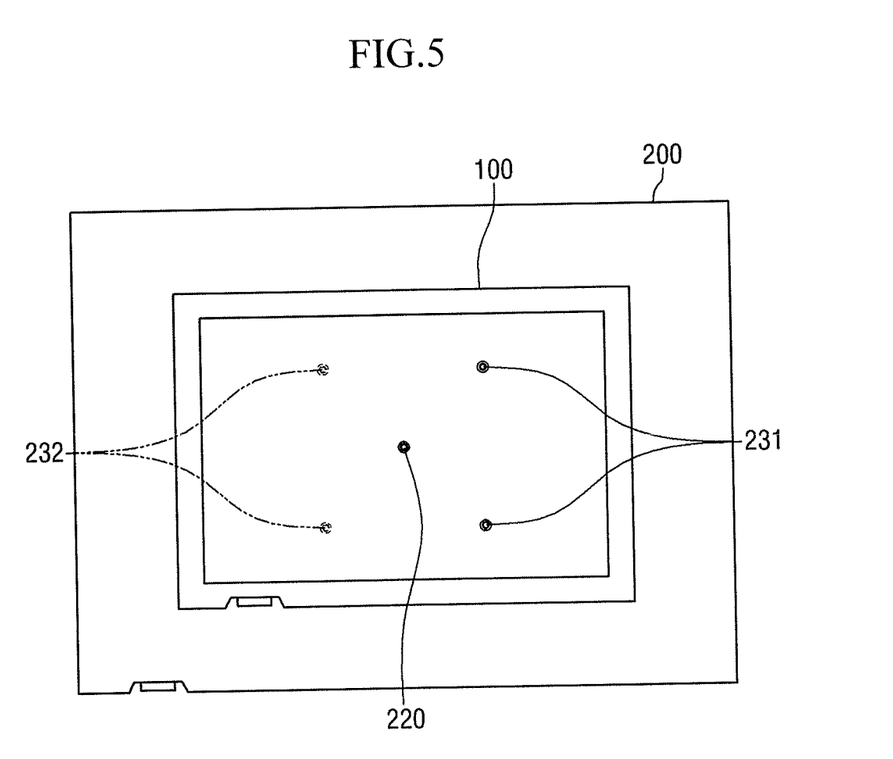

FIG. 5 illustrates a state in which the cassette 100 and the bucky 200 are combined with each other in the second connection mode. In the second connection mode, the first pair 231 may be arranged as two right second electrodes 231 connected to the second terminals 140, and the second pair 232 may be arranged as two left second electrodes 232 not connected to the second terminals 140, while the cassette 100 is connected to the bucky 200.

Figure 6:
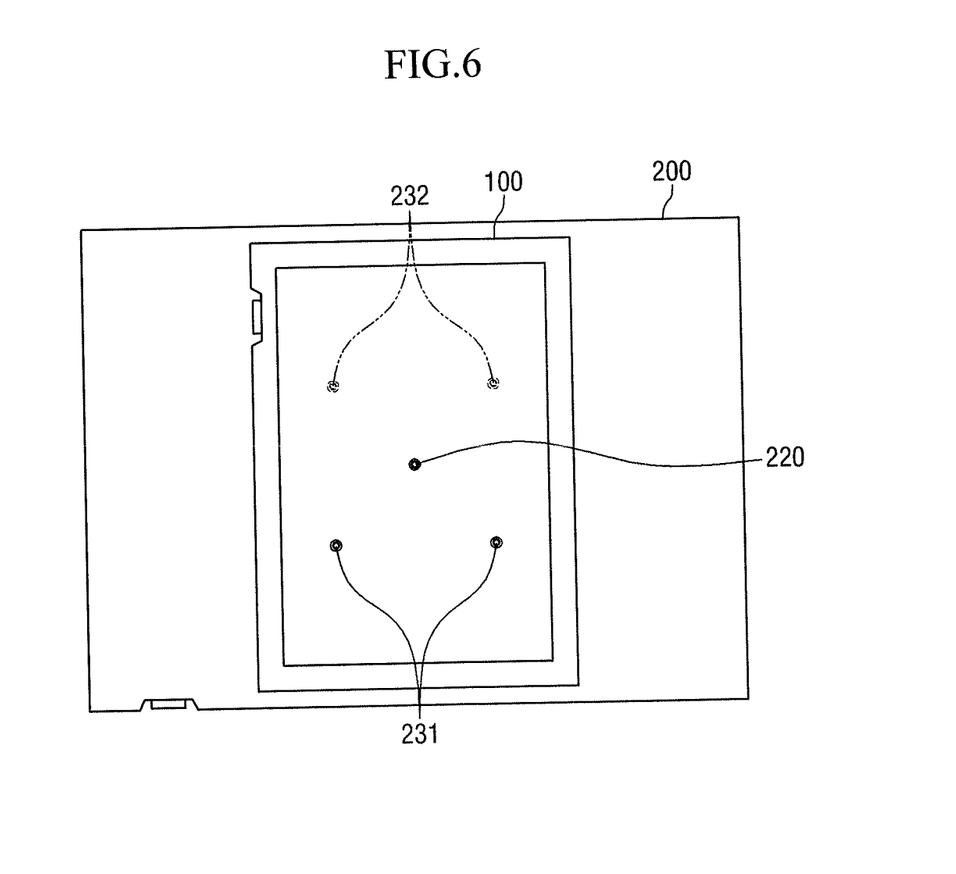

FIG. 6 illustrates a state in which the cassette 100 and the bucky 200 are combined with each other in the third connection mode. In the third connection mode, the first pair 231 may be arranged as two lower second electrodes 231 connected to the second terminals 140, and the second pair 232 may be arranged as two left second electrodes 232 not connected to the second terminals 140, while the cassette 100 is connected to the bucky 200.

Figure 7:
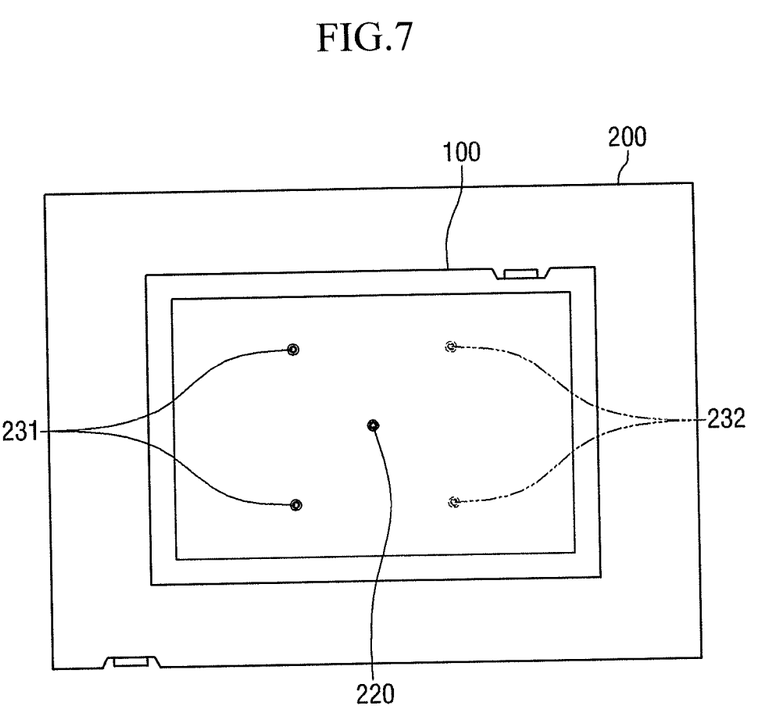

FIG. 7 illustrates a state in which the cassette 100 and the bucky 200 are combined with each other in the fourth connection mode. In the fourth connection mode, the first pair 231 may be arranged as two lower second electrodes 231 connected to the second terminals 140, and the second pair 232 may be arranged as two upper second electrodes 232 not connected to the second terminals 140, while the cassette 100 is connected to the bucky 200.

As shown in FIGS. 4 to 7, in the first to fourth connection modes, the first terminal 130 may be connected to the first electrode 220, and the second terminals 140 may be connected to some of the plurality of second electrodes 230. At least one of the second electrodes 230 connected to the second terminals 140 in one of the first to fourth connection modes may be different from the second electrodes 230 connected to the second terminals 140 in the other of the first to fourth connection modes. In other words, any connection mode of the first to fourth connection modes implements at least one different second electrode 230, as compared to the second electrodes 230 implemented in each of the other first to fourth connection modes. In addition, at least one of the second electrodes 230 connected to the second terminals 140 in one of the first to fourth connection modes may not be included in a set of the second electrodes 230 connected to the second terminals 140 in the other of the first to fourth connection modes.

In each of the first to fourth connection modes, the first electrode 220 may contact the first terminal 130 to be connected thereto. Therefore, the bucky 200, e.g., including one first electrode 220 and four second electrodes 230, may be connected to the cassette 100 at various angles, e.g., the bucky 200 may be positioned at different positions with respect to the cassette 100 to have different angles therebetween, like in the first to fourth connection modes. That is, in the X-ray detector according to an embodiment, the cassette 100 may be mounted in the bucky 200 at various angles, while reducing the number of electrodes formed in the bucky 200. In addition, in the X-ray detector according to an embodiment, the cassette 100 may be mounted in the bucky 200 at various angles while reducing the number of terminals disposed in the cassette 100.

If the cassette 100 is mounted in the bucky 200 in the first to fourth connection modes, the cassette 100 may be charged by the power supplied from the first electrode 220 and the second electrodes 230 of the bucky 200. That is, the X-ray detector according to an embodiment may not require a separate cable or a connection device for charging the cassette 100. Alternatively, the cassette 100 may also be charged just by mounting the cassette 100 in the bucky 200.

Referring back to FIG. 3, the bucky 200 may further include a first electrode connecting part 260 and second electrode connecting parts 250, a first power source 280, a second power source 270, and a second data terminal 240.

The first electrode connecting part 260 may be disposed within the bucky 200 and may connect the first electrode 220 and the first power source 280. The first electrode connecting part 260 may supply power from the first power source 280 to the first electrode 220. The first electrode 220 may be branched from the first electrode connecting part 260.

The second electrode connecting parts 250 may be disposed within the bucky 200 and may connect the second electrodes 230 and the second power source 270. The second electrode connecting part 250 may supply power from the second power source 270 to the plurality of second electrodes 230. The second electrodes 220 may be branched from the second electrode connecting parts 250. For example, the second electrode connecting parts 250 may be linear in a section between adjacent second electrodes 230. Each of the plurality of second electrodes 230 may be supplied with power from the second power source 270 through the second electrode connecting parts 250.

The first power source 280 may supply power to the first electrode 220 through the first electrode connecting part 260. According to some embodiments, the first power source 280 may be ground. The second power source 270 may supply power to the plurality of second electrodes 230 through the second electrode connecting parts 250. According to some embodiments, the first power source 280 may supply a plus (+) voltage.

A cable may be connected to the second data terminal 240. When the cable is connected to the second data terminal 240, the bucky 200 may be connected to an external device to exchange data. The external device connected to the bucky 200 may include the cassette 100. According to some embodiments, the bucky 200 may supply power for charging the cassette 100 through the second data terminal 240.

Figure 8:
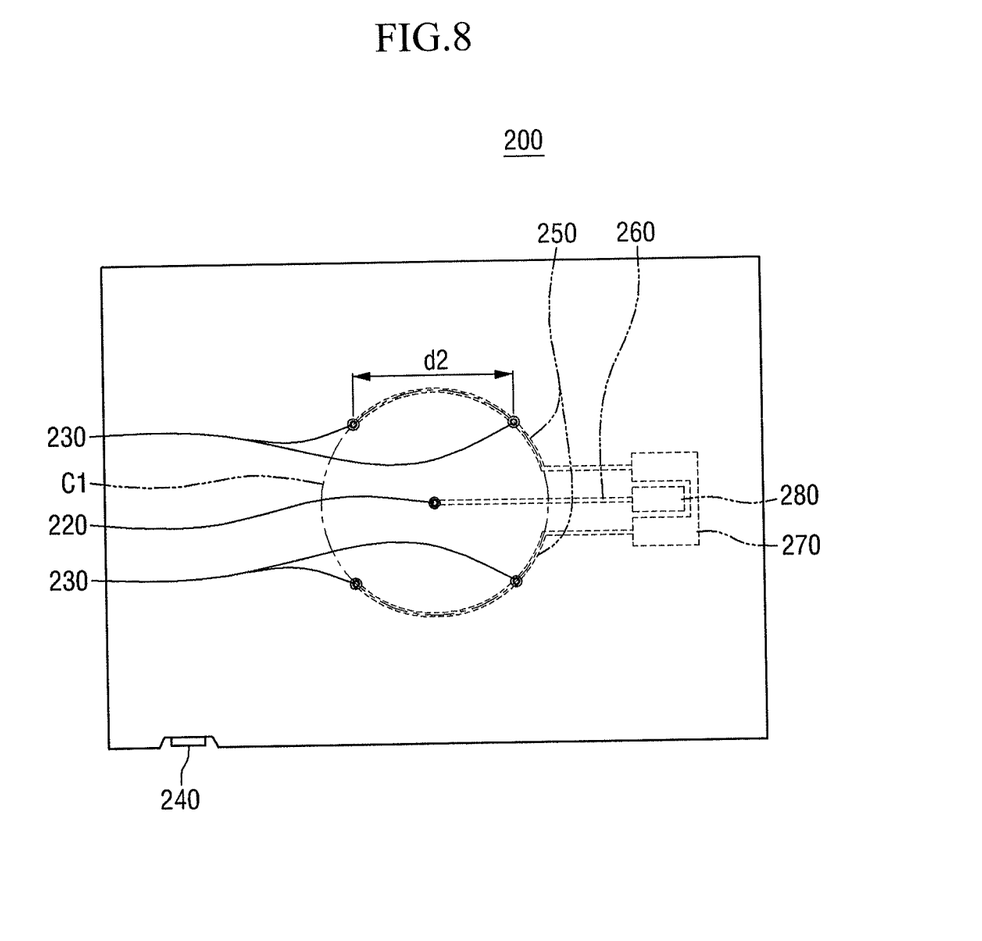
FIG. 8 is a plan view of a bucky according to another embodiment.

FIG. 8 is a plan view of a bucky according to another embodiment.

Referring to FIG. 8, at least some sections of the second electrode connecting parts 250 may be disposed on the circular arc of the circle C1. According to some embodiments, the sections of the second electrode connecting parts 250 connecting the plurality of second electrodes 230 may have a shape of the circular arc of the circle C1.

If the second electrodes 230 are added to the second electrode connecting parts 250, some sections of the second electrode connecting parts 250 may be disposed on the circle C1. In such a case, a distance between the first electrode 220 and the added second electrodes 230 is equal a distance between the first terminal 130 and the second terminal 140. Thus, when the cassette 100 is connected to the bucky 200, alignment is facilitated. Therefore, if at least some sections of the second electrode connecting parts 250 are disposed on the circle C1, the second electrodes 230 are easily added to the second electrode connecting parts 250, thereby extending connection modes between the cassette 100 and the bucky 200.

Figure 9:
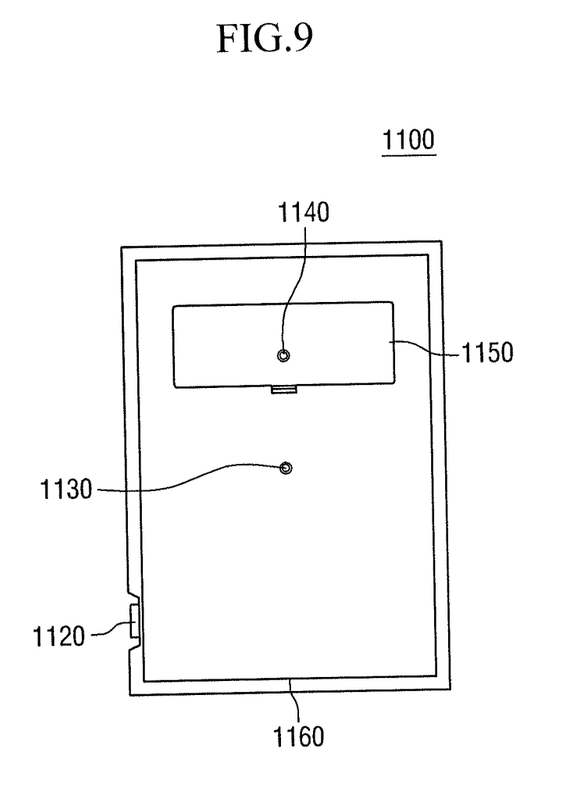
FIG. 9 is a bottom view of a cassette according to another embodiment.
Figure 10:
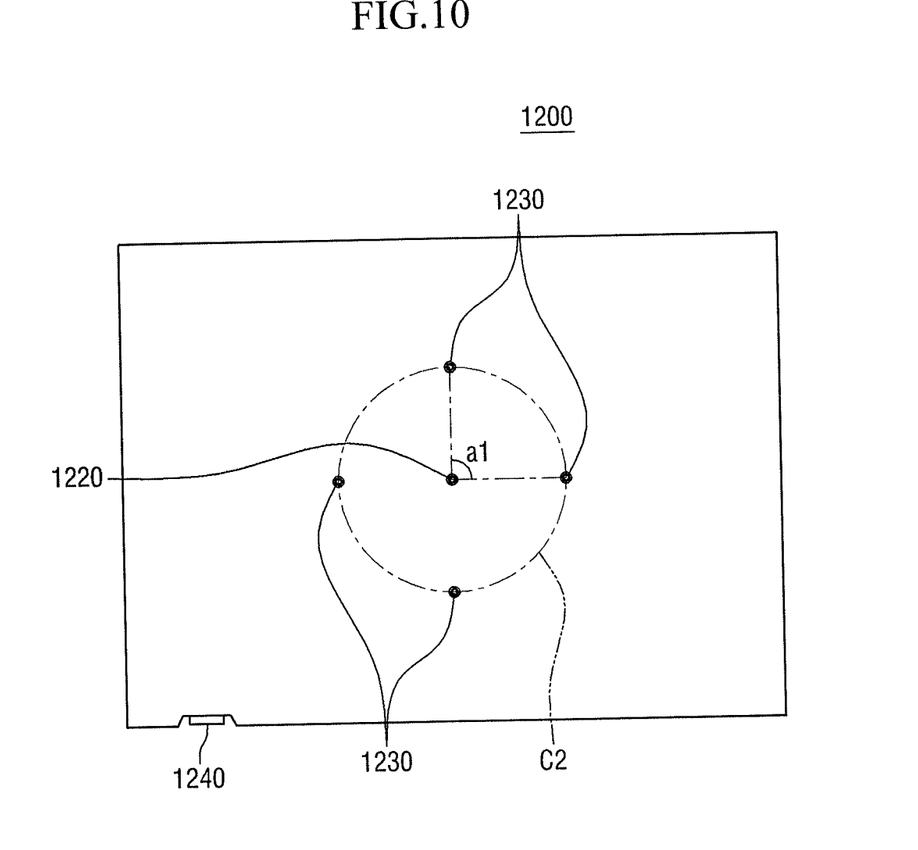
FIG. 10 is a plan view of a bucky according to still another embodiment.

FIG. 9 is a bottom view of a cassette according to another embodiment. FIG. 10 is a plan view of a bucky according to still another embodiment. An X-ray detector according to another embodiment will be described with reference to FIGS. 9 and 10.

Referring to FIG. 9, a cassette 1100 may include a first data terminal 1120, a first terminal 1130, a second terminal 1140, a battery 1150, and an insulation layer 1160. The cassette 1100 may include only one second terminal 1140.

According to some embodiments, an imaginary line connecting the second terminal 1140 and the first terminal 1130 may be parallel with two sides of the cassette 1100, e.g., having a rectangular plane. The imaginary line connecting the second terminal 1140 and the first terminal 1130 may be disposed equidistantly from the two sides of the cassette 1100.

Referring to FIG. 10, the bucky 1200 may include a first electrode 1220, a plurality of second electrodes 1230, and a second data terminal 1240. The plurality of second electrodes 1230 may be disposed on a circular arc of a circle C2 having the first electrode 1220 at its center. According to some embodiments, straight lines connecting arbitrary two adjacent ones of the plurality of second electrodes 1230 and the first electrode 1220 may intersect at a same angle a1. For example, the number of the second electrodes 1230 may be four, and the second electrodes 1230 may be disposed in a rectangular shape having respective second electrodes 1230 at vertexes of a rectangle.

When the cassette 1100 is mounted in the bucky 1200, the first terminal 1130 may be connected to the first electrode 1220 and the second terminal 1140 may be connected to one of the plurality of second electrodes 1230. If the number of second electrodes 1230 is n, there may be n connection modes in which the cassette 1100 is mounted in the bucky 1200 to then be connected thereto. While FIG. 10 illustrates four second electrodes 1230, the number of second electrodes may be changed in various manners. As shown in FIGS. 9 and 10, when one second terminal 1140 and n second electrodes 1230 are provided, the cassette 1100 and the bucky 1200 are connected in n connection modes, thereby implementing the X-ray detector including the cassette 1100 and the bucky 1200 connected to each other with a small number of terminals and electrodes in various connection modes.

According to some embodiments, if a distance between the first terminal 1130 and the second terminal 1140 of the cassette 1100 shown in FIG. 9 is equal to a distance between the first electrode 1220 and each of the second electrodes 1230 (or first and second electrodes 220 and 230 in FIG. 3), the cassette 1100 shown in FIG. 9 may be also mounted in the bucky 200 of FIGS. 3 and 8.

Figure 11:
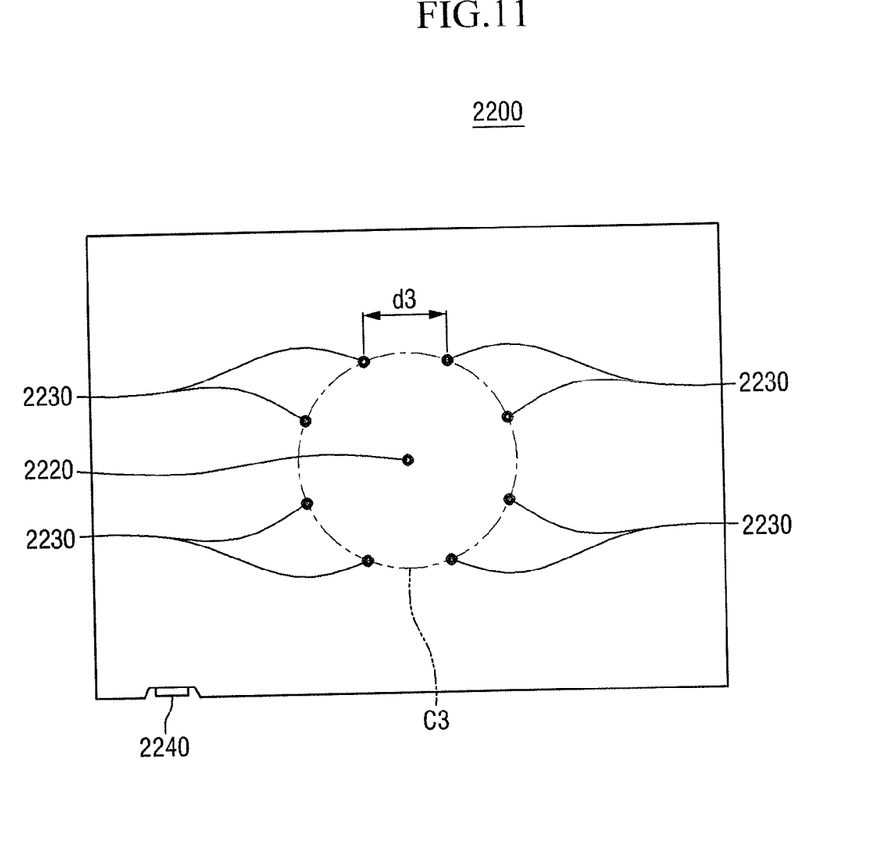
FIG. 11 is a plan view of a bucky according to still another embodiment.

FIG. 11 is a plan view of a bucky according to still another embodiment. Referring to FIG. 11, a bucky 2200 includes a first electrode 2220, a plurality of second electrodes 2230, and a second data terminal 2240.

For example, the number of the plurality of second electrodes 2230 may be eight, as shown in FIG. 11. The plurality of second electrodes 2230 may be disposed on a circular arc of a circle C3 having the first electrode 1220 as its center. A distance between adjacent second electrodes 2230 may be d3. According to some embodiments, d3 may be equal to d1 shown in FIG. 2. A distance between the first electrode 2220 and the second electrodes 2230 may be equal to a distance between the first terminal 130 and the second terminal 140 shown in FIG. 2. If d3 is equal to d1 and a distance between the first electrode 2220 and the second electrode 2230 is equal to a distance between the first terminal 130 and the second terminal 140, the cassette 100 shown in FIG. 1 may be mounted in the bucky 2200. The number of modes in which the cassette 100 is mounted in the bucky 2200 may be eight.

According to some embodiments, a distance between the first electrode 2220 and the second electrode 2230 may be equal to a distance between the first terminal 1130 and the second terminal 1140 shown in FIG. 9. If the distance between the first electrode 2220 and the second electrode 2230 is equal to the distance between the first terminal 1130 and the second terminal 1140 shown in FIG. 9, the cassette 1100 shown in FIG. 9 may be mounted in the bucky 2200.

According to embodiments, an X-ray detector may easily charge a cassette, when the cassette is mounted in the bucky. In addition, the X-ray detector may include a cassette mounted in a bucky at various angles with a simplified connection structure. Therefore, effective image detection according to the shape and arrangement of an object as a target of X-ray detection may be achieved, e.g., in a cassette type flat panel detector.

While example embodiments have been particularly shown and described, it will be understood by those of ordinary skill in the art that various changes in form and details may be made therein without departing from the spirit and scope of the inventive concept as defined by the following claims. It is therefore desired that example embodiments be considered in all respects as illustrative and not restrictive, reference being made to the appended claims rather than the foregoing description to indicate the scope of the invention.

What is claimed is:

1. An X-ray detector, comprising:
   a cassette including a first terminal and a second terminal; and
   a bucky including a first electrode and a plurality of second electrodes, the first terminal of the cassette being connected to the first electrode of the bucky and the second terminal of the cassette being connected to at least one of the plurality of second electrodes of the bucky,
   wherein the cassette and the bucky are configured to be connected to each other in at least two different connection modes, at least one of the second electrodes connected to the second terminal in a first connection mode being different from the second electrodes connected to the second terminal in a second connection mode.

2. The X-ray detector of claim 1, wherein the cassette further comprises a battery, the battery being configured to be charged in each connection mode.

3. The X-ray detector of claim 2, wherein the second terminal is disposed in the battery.

4. The X-ray detector of claim 1, wherein the first electrode is a ground electrode, and the plurality of second electrodes are plus (+) electrodes.

5. The X-ray detector of claim 4, wherein the plurality of second electrodes are connected to a same power supply.

6. The X-ray detector of claim 1, wherein the cassette further comprises an insulation layer exposing the first terminal and the second terminal.

7. The X-ray detector of claim 6, wherein the insulation layer includes a circular opening exposing the first and second terminals, the first terminal being in a center of the circular opening, and the second terminal being on a perimeter of the circular opening.

8. The X-ray detector of claim 1, wherein the bucky further comprises electrode connecting parts connected to two or more of the plurality of second electrodes, the second electrodes being connected to branches separated from the electrode connecting parts.

9. The X-ray detector of claim 8, wherein at least portions of the electrode connecting parts are shaped as circular arches about the first electrode.

10. The X-ray detector of claim 8, wherein the electrode connecting parts are linear between second electrodes connected to the electrode connecting parts.

11. The X-ray detector of claim 1, wherein the plurality of second electrodes are of pogo-pin types.

12. An X-ray detector, comprising:
a cassette including a first terminal, a second terminal, and a third terminal; and
a bucky including a first electrode and a plurality of second electrodes arranged around the first electrode, the first terminal of the cassette being connected to the first electrode of the bucky and the second terminal of the cassette being connected to only some of the plurality of second electrodes of the bucky,
wherein the cassette and the bucky are configured to be connected to each other in a plurality of connection modes including a first connection mode and a second connection mode, the second electrodes connected to the second terminal in the first connection mode being different from the second electrodes connected to the second terminal in the second connection mode, and the second electrode connected to the third terminal in the first connection mode is different from the second electrode connected to the third terminal in the second connection mode.

13. The X-ray detector of claim 12, wherein the cassette has a rectangular plane, the first to third terminals being arranged on the rectangular plane, and a straight line connecting the second terminal and the third terminal being parallel to one side of the plane.

14. The X-ray detector of claim 12, wherein a number of the plurality of second electrodes is n, the second electrodes being arranged in a shape of a regular n-polygon having each of the plurality of second electrodes at a vertex.

15. The X-ray detector of claim 12, wherein the number of the plurality of second electrodes is four, the plurality of second electrodes being arranged in a square shape.

16. The X-ray detector of claim 12, wherein a distance between the second terminal and the third terminal and a distance between adjacent ones of the plurality of second electrodes are equal to each other.

17. The X-ray detector of claim 12, wherein the cassette includes a battery, the battery being configured to be charged in each of the plurality of connection modes.

18. The X-ray detector of claim 17, wherein the second terminal and the third terminal are disposed in the battery.

19. The X-ray detector of claim 12, wherein the first electrode is a ground electrode, and the plurality of second electrodes are plus (+) electrodes.

20. The X-ray detector of claim 12, wherein the bucky includes electrode connecting parts connected to two or more of the plurality of second electrodes, and the second electrodes connected to the electrode connecting parts are shaped of branches separated from the electrode connecting parts.

* * * * *